United States Patent [19]

Kenigsberg et al.

[11] 4,057,363
[45] Nov. 8, 1977

[54] EXTENDED ARM BIFILAR AND METHOD TO ELIMINATE SECOND ORDER VIBRATION EXCITATION

[75] Inventors: Irwin Jeffrey Kenigsberg; William Francis Paul, both of Trumbull, Conn.

[73] Assignee: United Technologies Corporation, Hartford, Conn.

[21] Appl. No.: 633,886

[22] Filed: Nov. 20, 1975

[51] Int. Cl.² .............................................. B64C 27/32
[52] U.S. Cl. ..................................... 416/145; 416/500
[58] Field of Search .................. 74/574, 573; 416/145, 416/146, 500

[56] References Cited

U.S. PATENT DOCUMENTS

| B 576,158 | 3/1976 | Eastman et al. | 416/145 |
|---|---|---|---|
| 2,519,762 | 8/1950 | Hoffmann et al. | 416/500 X |
| 2,552,739 | 5/1951 | Roberts | 73/66 |
| 3,372,758 | 3/1968 | Jenney | 416/145 |
| 3,540,809 | 11/1970 | Paul et al. | 416/144 X |
| 3,874,818 | 4/1975 | Saunders et al. | 416/144 |
| 3,887,296 | 6/1975 | Mills et al. | 416/145 |
| 3,910,720 | 10/1975 | Vincent et al. | 416/145 |
| 3,932,060 | 1/1976 | Vincent et al. | 416/145 |
| 3,952,601 | 4/1976 | Galli | 73/455 |

*Primary Examiner*—Everette A. Powell, Jr.
*Attorney, Agent, or Firm*—Vernon F. Hauschild

[57] ABSTRACT

A helicopter has a plurality of bifilar absorbers mounted on arms radially extended from the hub of the rotor. A bifilar mass of the required weight mounted at the end of an arm of required length to absorb input excitations at a pendulum amplitude of approximately 30° at design forward speed is mounted on an arm twice the length without a reduction in weight of the bifilar mass to limit pendulum amplitude to 15° while maintaining the original force output. Bifilar motion in the linear range with associated elimination of overturning produces improved bifilar operation at all flight speeds and eliminates second order vibration due to dissimilar motions resulting from overtuning.

6 Claims, 10 Drawing Figures

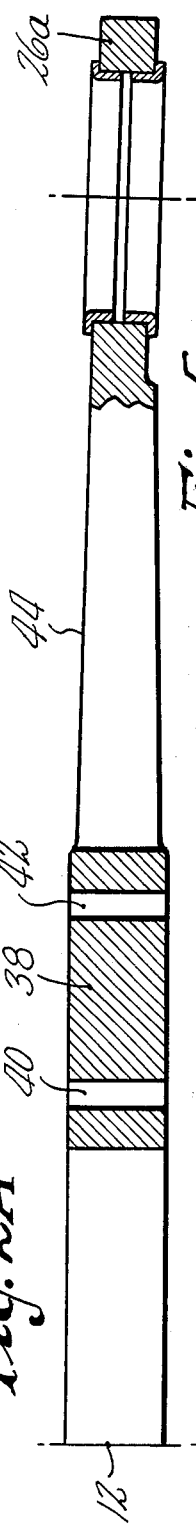
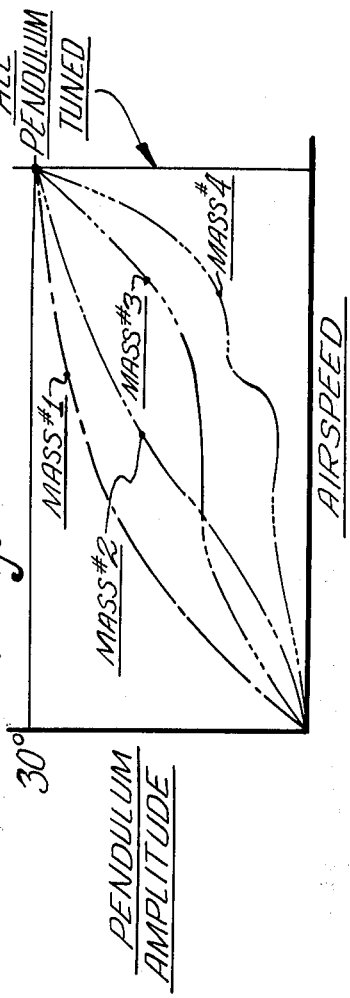
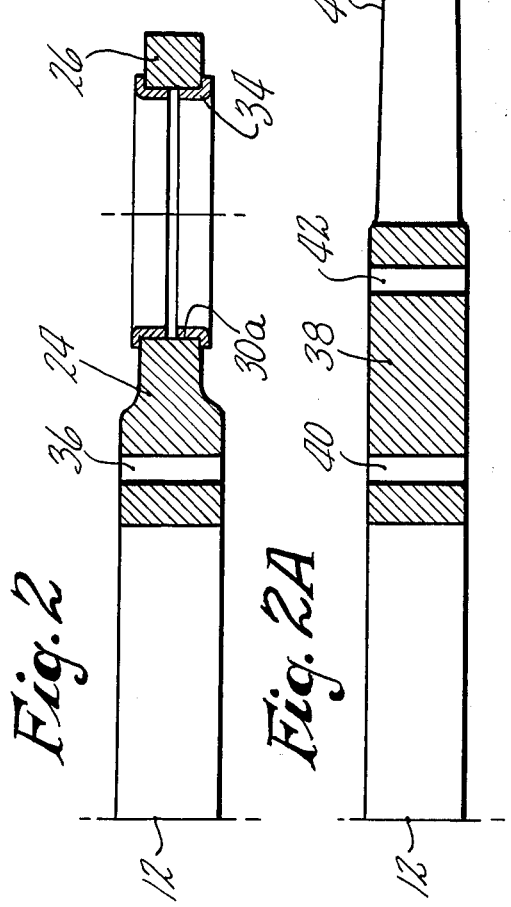
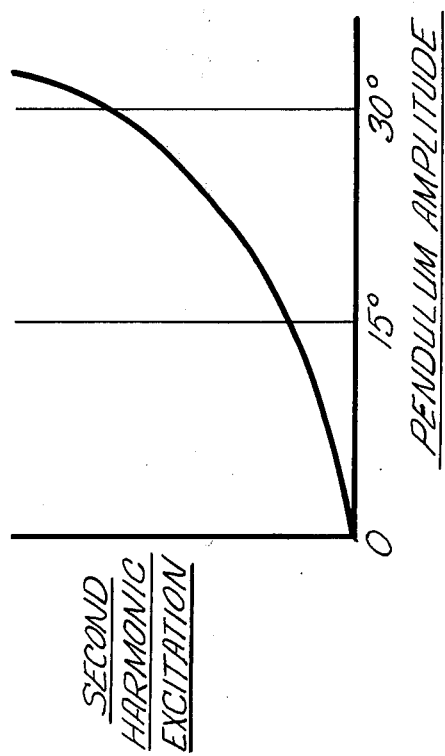

EXTENDED ARM BIFILAR AND METHOD TO ELIMINATE SECOND ORDER VIBRATION EXCITATION

The invention herein described was made in the course of or under a contract or subcontract thereunder with the Department of the Army.

CROSS REFERENCE TO RELATED APPLICATIONS

In a copending application of I. Kenigsberg and E. Carter, Ser. No. 631,577, filed Nov. 13, 1975, and assigned to the assignee of this application, a bifilar absorber is shown which is related to this application to the extent that the improvements disclosed in these two applications can be used together in the same basic bifilar absorber installation.

BACKGROUND OF THE INVENTION

1. Field of the Invention

This invention relates to the construction and use of bifilar absorbers as applied to helicopter rotors.

2. Description of the Prior Art

Prior to this invention bifilar absorbers as used on helicopter rotors have operated at approximately ± 30° amplitude at design forward speed. To prevent undertuning at any speed up to design forward speed the bifilar absorbers have been overtuned by increasing the tuning pin diameters. This results in dissimilar pendulum motions which produce rotating system vibratory excitations at twice the tuned frequency of the bifilar at all flight conditions except the design forward speed at which all of the masses of the bifilars reach an amplitude at which overtuning no longer exists. Due to dissimilar motions of the several absorbers on the rotor, these excitations will excite the fixed system, including the fuselage, at a frequency of $2w_n-1$, where $w_n$ = the tuned frequency of the bifilar absorber at the design forward speed.

U.S. Pat. No. 3,540,809, issued to W. Paul et al, illustrates a prior art installation of bifilar absorbers on helicopter rotors. The present invention is directed to improvements in such installations.

SUMMARY OF THE INVENTION

It is a principal object of this invention to provide an improved bifilar absorber installation and an improved method of operating bifilar absorbers as installed on helicopter rotors in which the amplitude of the bifilar masses is limited to angles at or below ± 15° up to design forward speed, thereby minimizing overtuning of the bifilars, to improve performance at all speeds and elimination of most dissimilar mass motions and the resulting second order vibrations.

Another object of this invention is to provide a helicopter rotor with bifilar absorbers in which bifilar motions are maintained in the linear range with no reductions in the bifilar/airframe mass ratio which is critical to bifilar effectiveness.

Still another object of this invention is to radially extend the bifilar absorbers with no reduction in mass to minimize overtuning by limiting amplitude of the bifilars to angles below ± 15°.

The Paul U.S. Pat. No. 3,540,809 mentions, Col. 8, lines 62 to 68, that the bifilar radius can be doubled while halving the mass to produce the same force output with no reduction in amplitude of motion. However, without a reduction in motion the bifilar would still require overtuning and thus produce the undesirable second order vibration and also reduce bifilar effectiveness at all speeds except the design forward speed.

In furtherance of the above objects the length of the bifilar support arm measured from the axis of rotation of the rotor to the center of gravity of the bifilar mass and the mass of the bifilar required to absorb excitations at pendulum amplitudes of approximately ± 30° is defined. This mass without reduction in weight is then mounted on a support arm of twice the length of the previous arm, thus halving the pendular motion while maintaining the original force output. Since at this reduced amplitude the bifilar motions are within the linear range the need for overtuning, with its inevitable second order vibration excitation to the fuselage, is eliminated.

A yet further object of this invention is generally to improve bifilar absorber installations for helicopter rotors.

BRIEF DESCRIPTION OF THE DRAWINGS

FIG. 2 is a sectional elevation showing an absorber supporting arm of FIG. 1;

FIG. 2A is a similar view, drawn to the same scale, showing an absorber supporting arm of the present invention;

FIG. 5 is a curve showing pendulum amplitude for the installation of FIG. 1 plotted against airspeed in a helicopter rotor having four bifilar absorbers, FIG. 6 is a curve showing single pendulum amplitude plotted against airspeed for the installation of FIG. 2A;

FIG. 8 is a curve similar to FIG. 5 for the improved bifilar installation of this invention; and FIG. 9 is a curve showing second harmonic excitation plotted against pendulum amplitude.

DESCRIPTION OF THE PREFERRED EMBODIMENT

Figure 1:
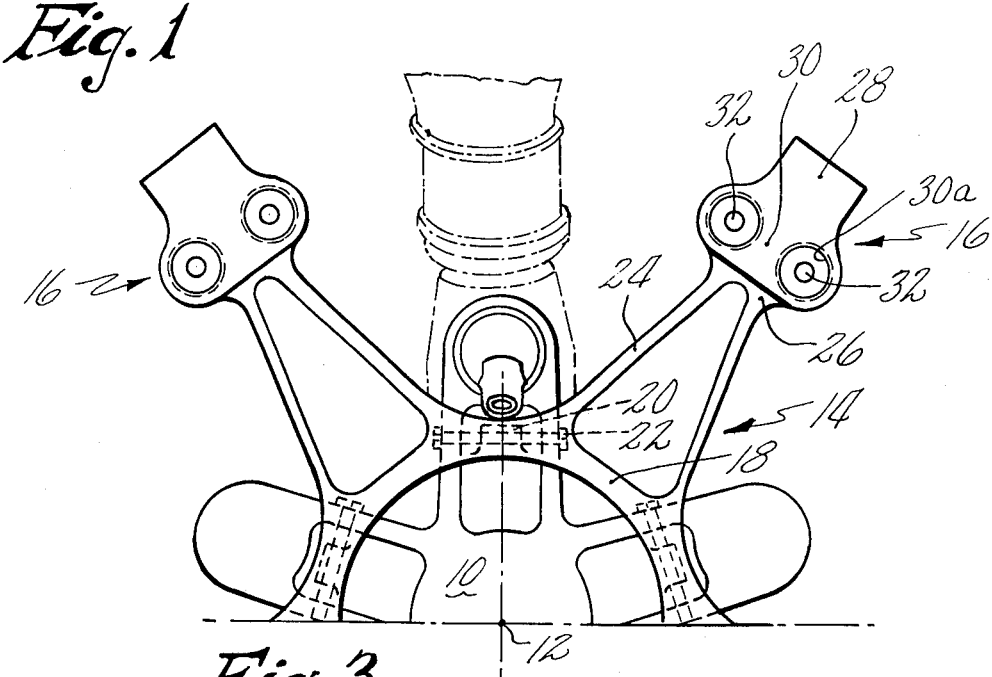
FIG. 1 is a partial plan view of a helicopter rotor showing a prior art installation of bifilar vibration absorbers.

FIG. 1 shows a prior art helicopter rotor including a rotor head 10 rotatable about an upright axis 12 and equipped with a support member 14 for a plurality of bifilar vibration absorbers 16, two of which are shown in this figure. Support member 14 includes a central ring 18 equipped with depending lugs 20 by which it is fixed to rotor head 10 by bolts 22 for rotation therewith in a plane normal to axis 12. Ring 18 has radially extending arms 24 which terminate in attaching portions 26 for bifilar absorbers. Each absorber consists essentially of a pendulous element including a mass 28 having similar upper and lower arms of which only the upper arm 30 is shown in FIG. 1 between which attaching portion 26 of arm 24 is received. The arms of mass 28 and attaching portion 26 of arm 24 have large, generally circular apertures 30a through which tuning pins 32 of the absorbers extend. Apertures 30a may have bushings 34, as indicated in FIG. 2, over which pins 32 move in a rolling fashion as the pendulous element swings.

FIG. 2A shows our new and improved bifilar support member which includes a central ring 38 equipped with two annular series of holes 40,42 by which it is attached to rotor hub 10 by bolts (not shown) and a longer radial arm 44 which terminates in a bifilar absorber attaching portion 26a similar to portion 26 in FIG. 2.

Figure 3:
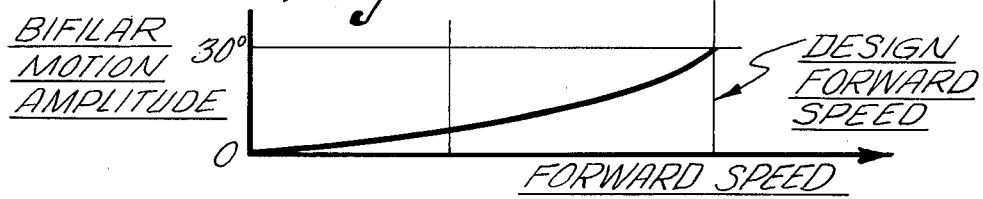
FIG. 3 is a curve showing single pendulum amplitude plotted against forward speed for the installation of FIG. 1.
Figure 4:
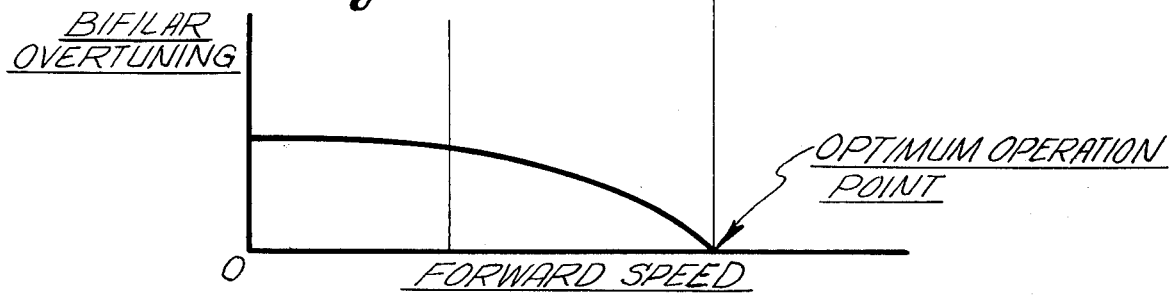
FIG. 4 is a curve showing bifilar overtuning plotted against forward speed for the installation of FIG. 1.

Prior to this invention bifilar absorbers as used on helicopter rotors have operated at approximately ± 30° amplitude at design forward speed. This is shown in the curve of FIG. 3. Due to the non-linear nature of the pendulum absorber, natural frequency will decrease with increasing amplitude. In order to prevent undertuning at any speed up to design forward speed, the bifilars have been initially overtuned. This is accomplished by increasing the diameter of the tuning pins 32 and results in the curve plotted in FIG. 4. This overtuning results in differences an amplitude and phase between the motions of all bifilar masses on the rotor at all flight conditions except the one in which sufficient input force exists to produce an amplitude high enough to force all of the bifilar masses to the amplitude at which all overtuning is eliminated. This situation is illustrated in FIG. 5 where pendulum amplitude is plotted against airspeed.

An additional disadvantage of the prior installation of FIGS. 1 and 2 occurs due to the fact that the bifilar pendulums produce a second harmonic force which, if all pendulum motions are not equal, will transfer into the fixed system, including the fuselage, of the helicopter at one harmonic of rotor speed less, than its frequency in the rotating system i.e.

Figure 7:
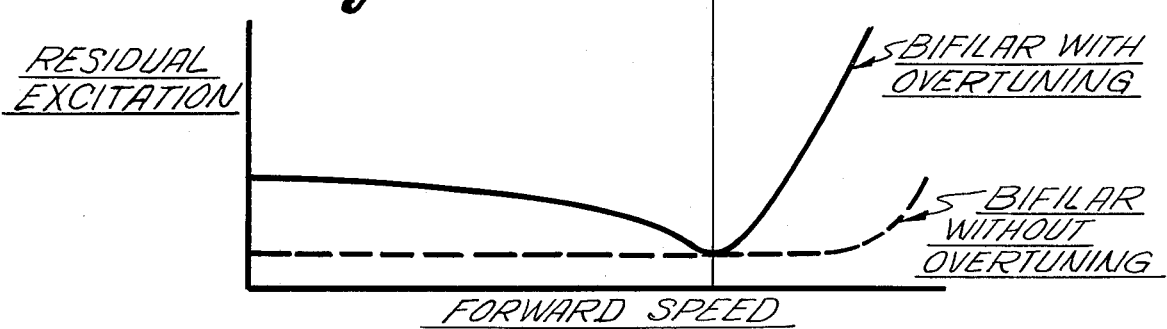
FIG. 7 is a curve comparing residual excitation plotted against forward speed for the installations of FIGS. 2 and 2A.

$w_n$ pendulum = 3/rev.
2nd harmonic = 6/rev.
Fixed system excitation at 5/rev, where
$w_n$ = the tuned frequency of the bifilar absorber, By this invention these difficulties caused by overtuning and the resulting second harmonic forces are eliminated by providing an installation in which the amplitude of the bifilar masses is limited to angles at or below 15°, thereby minimizing overtuning of the bifilars to improve performance at all speeds, as shown in FIG. 7, and elimination of most dissimilar mass motions and the resulting second order vibrations.

FIG. 9 shows very clearly the advantages of operating the bifilar absorbers at or below a pendulum amplitude of 15° where the second harmonic excitation is relatively low rather than, as prior to this invention, at 30° amplitude.

The bifilar absorber is first sized to determine the mass required to absorb the input excitation force at ± 30° of motion. The bifilar support arm is then extended to reduce the motion to ± 15° with no reduction in mass. This extension of the bifilar support arm is roughly equal to a doubling of the length of the arm in the FIG. 1 installation and eliminates overtuning requirements, maintains equal motions of the several bifilars of the installation and reduces any second harmonic force by a significant amount. FIG. 8 shows the results of this invention, especially when compared with FIG. 5 which is representative of the prior art bifilar installations.

While we have shown and described one embodiment of our invention, we do not wish to be limited to the exact details of construction shown and described for obvious modifications will occur to a person skilled in this art.

We claim:

1. In a helicopter having a hub, a support member rotatable with said hub having a plurality of radially extended arms, a bifilar absorber mounted at the extremity of each arm having a pendulous mass, the length of said arms measured from the axis of rotation of said rotor to the c.g. of said masses and the weight of said masses being such as to absorb input excitations at design forward speed at pendulum amplitude of approximately ± 30°, that improvement comprising the combination of said pendulous masses having the same weight with new radially extended supporting arms of substantially double the length of said first mentioned arms.

2. In a bifilar vibration absorber for a helicopter rotor including a support arm of length n for a pendulous mass of sufficient weight of absorb input excitations at design forward speed at a pendulum amplitude of approximately ± 30°, that improvement comprising the combination with said pendulous mass of means for eliminating second order excitations in the helicopter fuselage by causing said absorber to operate in a more linear range at amplitude no greater than ± 15°, said means comprising a new and longer arm of length 2n replacing said arm n for supporting said pendulous mass with no reduction in weight of said mass.

3. A bifilar absorber installation for a helicopter rotor including a support member carried by said rotor having a plurality of radially extended arms of length n, each adapted to support a bifilar absorber at its extended end, each absorber including a pendulous mass of sufficient weight to absorb input excitations at design forward speed at pendulum amplitude of ± 30°, that improvement which consists in the combination with said pendulous masses of means for eliminating dissimilar motions of the several absorbers on the rotor due to overtuning below design forward speed which excite the fuselage of the helicopter at a frequency $2w_n - 1$, where $w_n$ = the tuned frequency of the absorbers at design forward speed and causing said absorbers to operate at pendulum amplitude of 35 15°, said means consisting of new arms for supporting said pendulous masses of substantially length 2n replacing said arms of length n.

4. In a vibration absorber for a helicopter rotor including a pendulous mass of sufficient weight to absorb primary in-plane input excitations transmitted from the rotor to said fuselage at design forward speed, and means for eliminating second order excitations in the helicopter fuselage, said means comprising a support arm for said pendulous mass of sufficient length to cause said absorber to operate in a linear range at amplitude no greater than ± 15°.

5. In a vibration absorber for a helicopter rotor having a plurality of absorbers, each including a pendulum mass of sufficient weight of absorb input excitations at design forward speed including means for eliminating dissimilar motions of the several absorbers on the rotors due to overtuning below design forward speed which excites the fuselage of the helicopter at a frequency $2w_n - 1$, where $w_n$ = the tuned frequency of the absorbers at design forward speed, said means consisting of arms for supporting said means which are of sufficient length to limit the pendulum amplitude to less than ± 15°.

6. In a helicopter rotor, a hub, a support member rotatable with said hub having a plurality of radially extended arms, a bifilar absorber mounted at the extremity of each arm having a pendulous mass, the weight of said mass being sufficient to absorb the primary in-plane vibrations of the rotor as determined by the dynamics of the rotor hub and said arms having a length measured from the axis of rotation of said rotor to the c.g. of said masses which limits the pendulum amplitude of said absorbers at design forward speed to ± 15°.

* * * * *

UNITED STATES PATENT OFFICE
CERTIFICATE OF CORRECTION

PATENT NO. : 4,057,363
DATED : November 8, 1977
INVENTOR(S) : Irwin J. Kenigsberg and William F. Paul It is certified that error appears in the above-identified patent and that said Letters Patent are hereby corrected as shown below:

Column 4, Line 42  Delete "35" and insert --$\pm$--

Column 4, Line 64  Delete "means" and insert --masses--

Signed and Sealed this

Twenty-third Day of May 1978

[SEAL]

Attest:

RUTH C. MASON
Attesting Officer

LUTRELLE F. PARKER
Acting Commissioner of Patents and Trademarks